United States Patent [19]

Matsumoto et al.

[11] 4,362,341
[45] Dec. 7, 1982

[54] LOW-NOISE LEVEL INTERNAL COMBUSTION ENGINE

[75] Inventors: Yasuo Matsumoto, Yokohama; Yoshimasa Hayashi, Kamakura, both of Japan

[73] Assignee: Nissan Motor Co., Ltd., Yokohama, Japan

[21] Appl. No.: 142,960

[22] Filed: Apr. 23, 1980

[30] Foreign Application Priority Data

Apr. 25, 1979 [JP] Japan .......................... 54-56320[U]

[51] Int. Cl.³ .............................................. F16C 9/00
[52] U.S. Cl. ................................... 308/26; 308/23; 308/179; 308/237 R
[58] Field of Search .............. 308/26, 167, 237 R, 308/179, 23

[56] References Cited

U.S. PATENT DOCUMENTS 4,040,690  8/1977  Finney .................................. 33/26

FOREIGN PATENT DOCUMENTS 740635  11/1932  France .................................. 308/26
806373  12/1958  United Kingdom ............... 308/167

Primary Examiner—William D. Martin, Jr.
Attorney, Agent, or Firm—Thompson, Birch, Gauthier & Samuels

[57] ABSTRACT

An internal combustion engine is provided with a bore for receiving the journal of a crankshaft which bore is defined by a lower section of a cylinder block and a bearing cap secured to the cylinder block. A cylindrical housing provided at its inner surface with a metal sleeve bearing is disposed in the bore so as to rotatably support the crankshaft journal. Additionally, a cylindrical elastic member is securely disposed between the outer surface of the cylindrical housing and the peripheral surface of the bore, thereby absorbing vibration transmitted through a piston to the crankshaft, which vibration is due to pressure generated in engine cylinders.

8 Claims, 7 Drawing Figures

FIG.3
FIG.7
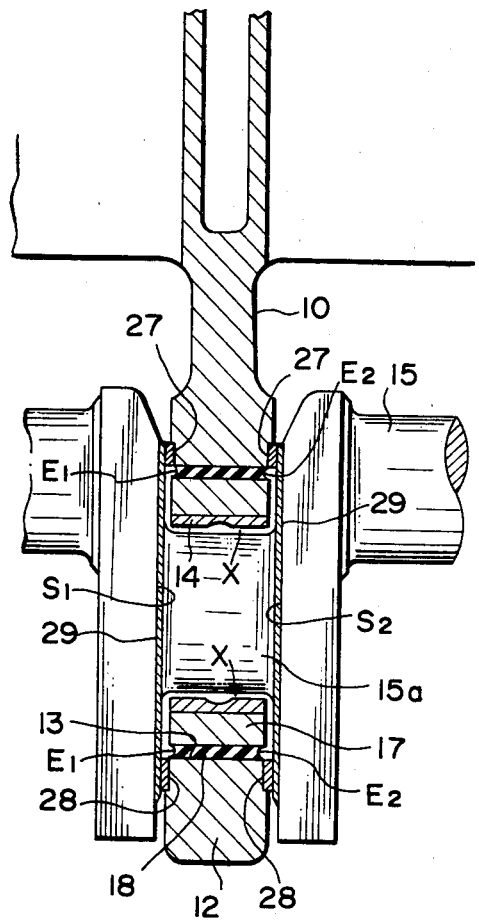
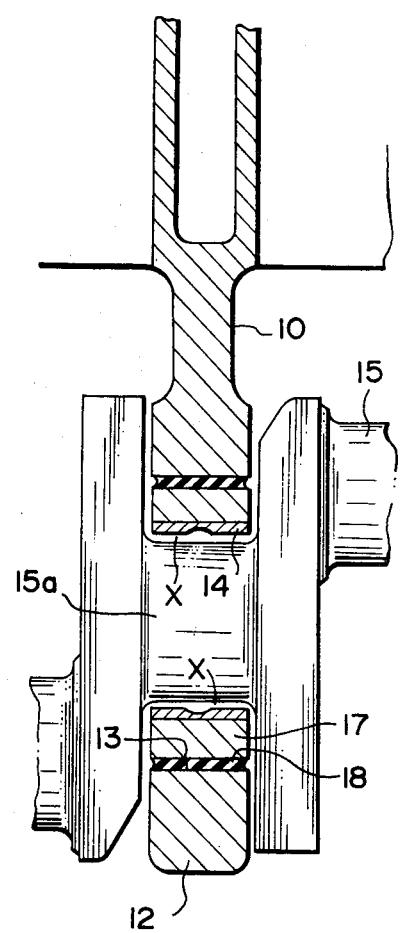

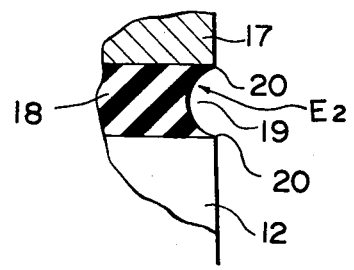
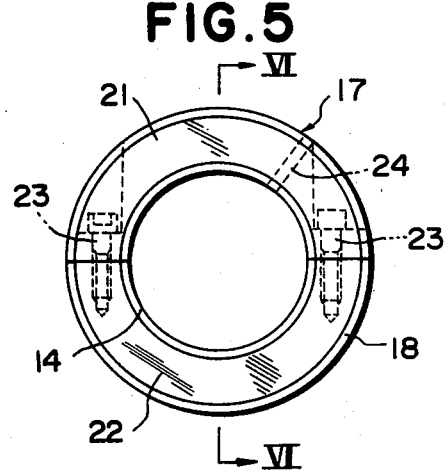
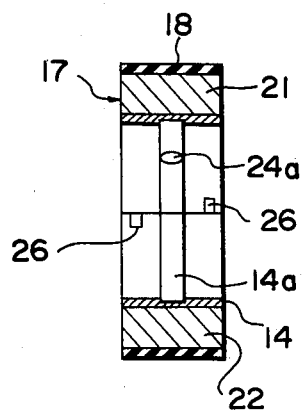

LOW-NOISE LEVEL INTERNAL COMBUSTION ENGINE

This invention relates in general to a low-noise level internal combustion engine, and more particularly to a construction of the engine by which engine noise due to pressure generated in the engine cylinders is effectively lowered.

A main object of the present invention is to provide an improved internal combustion engine, in which noise emitted by the engine is effectively lowered.

Another object of the present invention is to provide an improved internal combustion engine, in which vibration of the engine block is prevented, thereby preventing vibration of the skirt section of a cylinder block and accordingly an oil pan secured to the bottom section of the cylinder block.

A further object of the present invention is to provide an improved internal combustion engine, in which vibration due to pressure generated in an engine cylinder, to be transmitted through a piston to a crankshaft, is effectively absorbed by an annular elastic member disposed around an annular housing in which the journal section of the crankshaft is rotatably disposed through a metal sleeve bearing.

Other objects, features and advantages of the improved internal combustion engine according to the present invention will become more apparent from the following description when taken in conjunction with the accompanying drawings wherein like reference numerals designate like parts and elements, in which:

FIG. 3 is an enlarged vertical sectional view through the engine part of FIG. 2;

FIG. 4 is an enlarged sectional view showing the shape of the edge of the annular elastic member in FIG. 3;

FIG. 5 is a front view of the annular housing for the crankshaft shown in FIG. 3;

FIG. 6 is a vertical sectional view taken along the line VI—VI of FIG. 5; and

FIG. 7 is a vertical section view similar to FIG. 3, but showing another embodiment of the invention.

Figure 1:
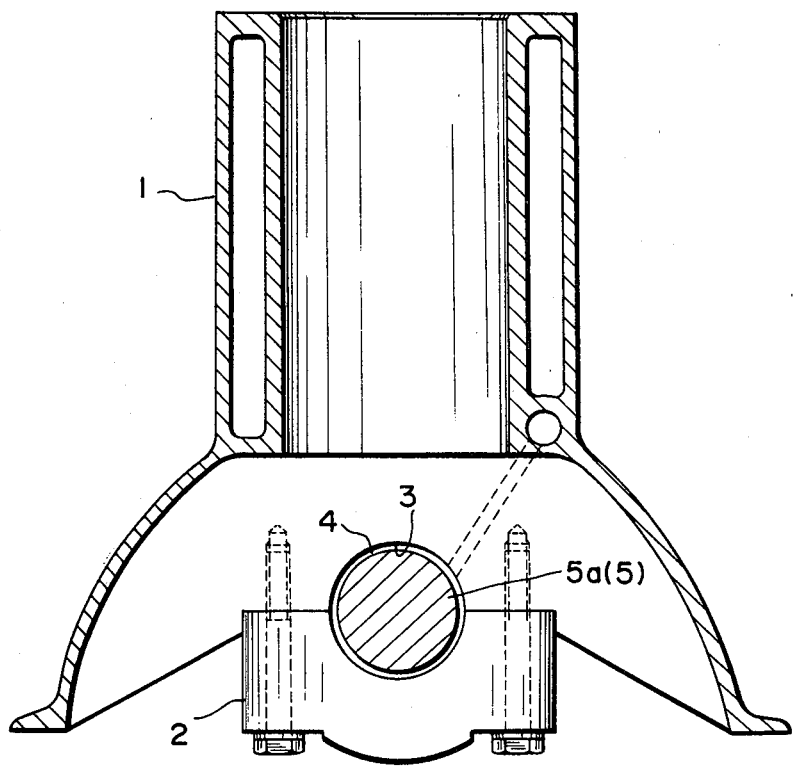
FIG. 1 is a vertical cross-sectional view showing part of a conventional internal combustion engine.

In a conventional internal combustion engine, a cylindrical bore is formed between a lower section of a cylinder block 1 and a bearing cap 2 which is secured to the cylinder block 1 with bolts. A cylindrical metal sleeve bearing 4 is inserted in the bore so as to rotatably support the journal section of a crankshaft through an oil film formed between the inner surface of the metal sleeve bearing and the outer surface of the crankshaft journal.

With this construction, oil films exist between the crankshaft 5 and the cylinder block 1 and bearing cap 2, by which some of high frequency components of pressure due to fuel combustion are absorbed. However, almost all the high frequency components are directly transmitted through the crankshaft 5 to the cylinder block 1 and the bearing cap 2. The thus transmitted high frequency components of the pressure vibrate a skirt section of the cylinder block 10 and an oil pan (not shown) secured to the cylinder block, which will result in a major source of engine noise.

In view of the above, the present invention contemplates overcoming the problems encountered in the above-mentioned conventional internal combustion engine, by disposing an annular housing provided at its inner surface with a bearing within a metal sleeve cylindrical bore for rotatably supporting the journal section of a crankshaft, through an annular elastic member located between the peripheral surface of the bore and the outer surface of the annular housing. With this arrangement according to the present invention, the vibration to be transmitted to the cylinder block and the bearing cap is absorbed so as to prevent a cylinder block skirt section and an oil pan from vibrating, thereby suppressing generation of engine noise.

Figure 2:
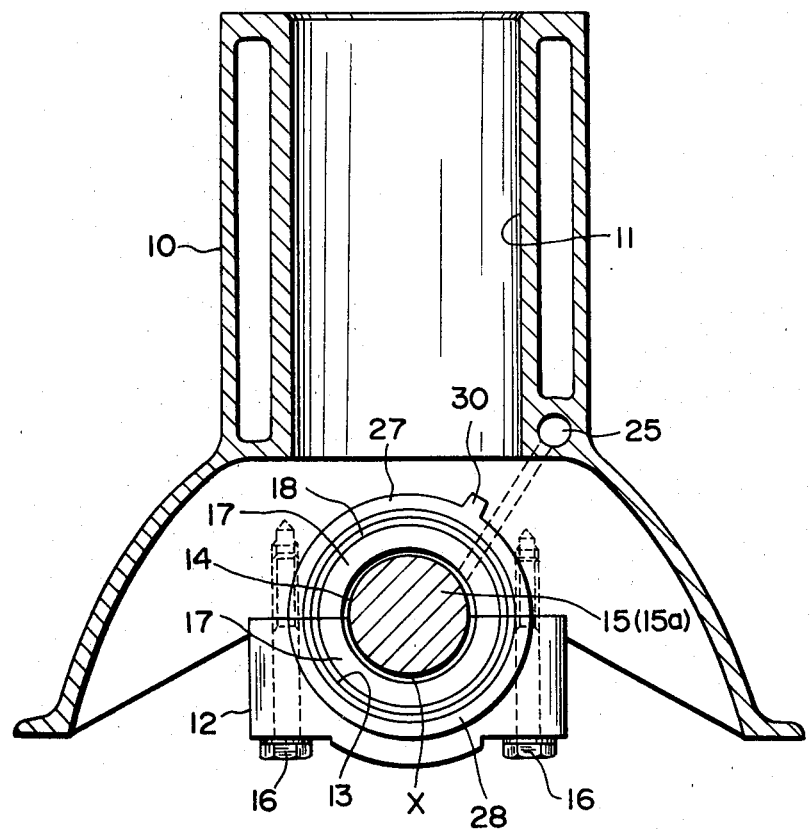
FIG. 2 is a vertical cross-sectional view of a similar part of internal combustion engine in accordance with one embodiment of the present invention.

Referring now to FIGS. 2 and 3 of the drawings, there is shown an embodiment of an internal combustion engine according to the present invention which engine is, for example, to be used in an automotive vehicle. The engine is composed of a cylinder block 10 which is formed with cylinders or a cylinder 11 in which a piston (not shown) is reciprocally disposed. A bearing cap 12 is secured to a lower section of the cylinder block 10 with bolts 16. The lower section of the cylinder block 10 and the bearing cap 12 forms therebetween a cylindrical bore 13 for rotatably receiving the journal section 15a of a crankshaft 15. A cylindrical housing 17 is disposed within the cylindrical bore 13. A metal sleeve bearing 14 is secured to the inner surface of the cylindrical housing 17. The annular housing 17 rotatably supports the journal of the crankshaft 15 through the metal sleeve bearing 14. A film of engine lubricating oil exaggeratingly indicated at X in the drawings is formed between the peripheral surface of the crankshaft journal and the inner surface of the metal sleeve bearing 14.

A cylindrical elastic member 18 is disposed between the outer surface of the housing 17 and the peripheral surface of the bore 13 defined by the semicylindrical surface of the lower section of the cylinder block 10 and the opposite semicylindrical surface of the bearing cap 12. The elastic member 18 which for example can be made conventionally from hard nitride butadine rubber, silicone rubber, or a rubber containing fluorine is securely disposed in the above-mentioned position by means of insertion, baking, and adhesion. The cylindrical elastic member 18 is formed with an annular groove 19 in its opposite end edges $E_1$ and $E_2$. The annular groove 19 has the semicircular cross-section leaving pointed portions 20 in cross-section as clearly shown in FIG. 4. This construction of the end edge of the annular groove 19 prevents stress from being gathered at these edges during absorption of vibration.

As shown in FIGS. 5 and 6, the cylindrical housing 17 is formed as an assembly of semicylindrical counterpart members 21, 22 interconnected by bolts 23 which are recessed below the peripheral surface of the counterpart member 21. The metal sleeve bearing metal 14 is formed with an annular groove 14a (see FIG. 6) into which engine lubricant oil flows. An oil passage 24 is formed radially through the housing 17. The oil passage 24 opens to the annular groove 14a of the metal sleeve bearing 14 through an opening 24a. The oil passage 24 is in communication with an oil passage 25 formed in the cylinder block 10 as shown in FIG. 2. In order to maintain the connection between the oil passages 24 and 25, a key or a pin may be used though not shown when the housing 17 is inserted into the bore 13 so as to prevent the housing from rotating. The reference numerals 26 in FIG. 6 denote pins for restricting the movement of the metal sleeve bearing 14.

In addition to the above, the internal combustion engine may be provided with measures for preventing thrust or axial movement of the crankshaft 15, which will be explained hereinafter with reference to FIGS. 2 and 3. Two annular grooves (no numeral) are formed respectively at left and right side surfaces of the above-mentioned lower section cylinder block 10 and also respectively at left and right side surfaces of the bearing cap 12 in a manner to surround the periphery of the cylindrical bore 13. Semiannular upper and lower bearing plates 27 and 28 are disposed in each of the annular grooves so as to form oppositely facing annular plate type bearings. The two annular plate type bearings are arranged to contact opposed thrust plates secured to opposite vertical wall surfaces $S_1$ and $S_2$ of the crankshaft 15. With this arrangement, the crankshaft 15 is prevented from moving axially so that the bearing cap 12 does not directly strike against the vertical wall surfaces of the crankshaft 15, for example, during operation of a clutch (not shown) in the engine. The reference numeral 30 in FIG. 2 denotes a stop for preventing the upper and lower bearing plates 27 28 from rotation. It will be understood that such an arrangement for preventing the axial movement of the crankshaft 15 is sufficient to employ only at a part of the crankshaft 15, and accordingly it may be possible to omit such an arrangement at other parts of the crankshaft 15 as illustrated in FIG. 7.

With the thus arranged internal combustion engine, since the crankshaft 15 is rotatably supported by the lower section of the cylinder block 10 and the bearing cap 12 through the oil film X, the metal sleeve bearing 14, the cylindrical housing 17, and the elastic member 18, the vibration due to combustion-caused pressure, transmitted from the piston to the crankshaft 15, is absorbed by the oil film X and particularly effectively by the elastic member 18. Accordingly, this vibration is extremely effectively prevented from being transmitted to the cylinder block 10 and the bearing cap 12. As a result, the vibration of the skirt section of the cylinder block 10 and the oil pan is effectively suppressed, thereby reducing generation of engine noises based on vibrations.

Now, the inventors' experiments have revealed that several microns of a relative displacement allowance in the radial direction between the crankshaft 15 and the cylinder block 10, the bearing cap 12 is sufficient to absorb the vibration of 1 KHz which is particularly severe in engine noises. In this regard, several mm of the radial dimension (thickness) of the elastic member is sufficient to absorb the displacement of the above-mentioned several microns.

As appreciated from above, according to the present invention, a cylindrical housing provided at its inner surface with a metal sleeve bearing is disposed through a cylindrical elastic member in a bore defined by the lower section of a cylinder block and a bearing cap, the journal of a crankshaft being supported by the metal sleeve bearing. Accordingly, the vibration due to the combustion-caused pressure, transmitted on the crankshaft, is effectively absorbed by the cylindrical elastic member. This prevents vibration from being transmitted to the cylinder block, which reduces the vibrations of the skirt section of the cylinder block and an oil pan secured to the cylinder block. As a result, noises radiated from an engine is greatly decreased, which is significantly advantageous in practical use.

What is claimed is:

1. An internal combustion engine having a bore for receiving a crankshaft which bore is defined between opposed semicylindrical surfaces located respectively on a cylinder block and a bearing cap, said engine comprising:
    a cylindrical housing disposed in said bore;
    a metal sleeve bearing extending coaxially through and fixedly retained in said cylindrical housing, said metal sleeve bearing having a journal of said crankshaft rotatably supported therein; and
    a cylindrical elastic member disposed between the outer surface of said cylindrical housing and the semicylindrical surfaces of the cylinder block and the bearing cap, thereby absorbing vibration transmitted to the crankshaft.

2. An internal combustion engine as claimed in claim 1, in which said cylindrical housing includes two semicylindrical counterpart members which are combined with each other with bolts.

3. An internal combustion engine as claimed in claim 2, in which said cylindrical elastic member is securely bonded onto the outer surface of said cylindrical housing.

4. An internal combustion engine as claimed in claim 3, in which said bonding is carried out by means of baking.

5. An internal combustion engine as claimed in claim 3, in which said bonding is carried out by means of adhesion.

6. An internal combustion engine as claimed in claim 1, in which said cylindrical elastic member has two opposite annular end edges each of which is formed with an annular groove which is semicircular in cross-section.

7. An internal combustion engine as claimed in claim 1, further comprising first semiannular upper and lower bearing plate members which are secured at first grooves respectively formed on the cylinder block and the bearing cap so as form a first annular bearing plate which is disposed around the bore defined by the cylinder block and the bearing cap, and a first thrust plate which is arranged to be contacted by said first annular bearing plate and which is secured to a first vertical wall surface of said crankshaft.

8. An internal combustion engine as claimed in claim 7, further comprising second semiannular upper and lower bearing plate members which are secured at second grooves respectively formed opposite to said first grooves on the cylinder block and the bearing cap to form a second annular bearing plate which is disposed around the bore, and a second thrust plate which is arranged to be contacted by said second annular bearing plate and which is secured to a second vertical wall surface of said crankshaft, opposite to said first vertical wall surface.

* * * * *